United States Patent [19]

Mallaney et al.

[11] Patent Number: 4,726,178
[45] Date of Patent: Feb. 23, 1988

[54] DISCHARGE COVER ASSEMBLY

[75] Inventors: Brian T. Mallaney, Rock Hill; Frank R. Allen, Columbia; Charles Gaymon, Rock Hill, all of S.C.

[73] Assignee: Textron Inc., Providence, R.I.

[21] Appl. No.: 922,588

[22] Filed: Oct. 24, 1986

[51] Int. Cl.⁴ ............................................. A01D 34/46
[52] U.S. Cl. ......................................... 56/202; 56/320.2
[58] Field of Search .................... 56/202, 320.2, 320.1, 56/255, 256, 13.6, 13.3, 13.4, 17.5, 239

[56] References Cited

U.S. PATENT DOCUMENTS

| | | | |
|---|---|---|---|
| 2,973,614 | 3/1961 | Horner et al. | 56/202 |
| 3,192,692 | 7/1965 | Slemmons | 56/202 |
| 4,189,903 | 2/1980 | Jackson et al. | 56/255 |
| 4,205,512 | 6/1980 | Thorud | 56/13.4 |
| 4,435,949 | 3/1984 | Heismann | 56/255 |

Primary Examiner—Gene Mancene
Assistant Examiner—Marie Britt
Attorney, Agent, or Firm—Abraham Ogman

[57] ABSTRACT

The invention is directed to a cover assembly for the discharge opening of a lawn mower, which cover assembly serves the unique triple function of (i) mulching, (ii) side-discharging with a fail-safe anti-damage feature, and (iii) enabling the attachment needed for rear bagging to be mounted without removing the cover assembly. The cover assembly also includes transition means for dispersing the cuttings over a wide area as the cuttings are discharged from the discharge opening.

8 Claims, 12 Drawing Figures

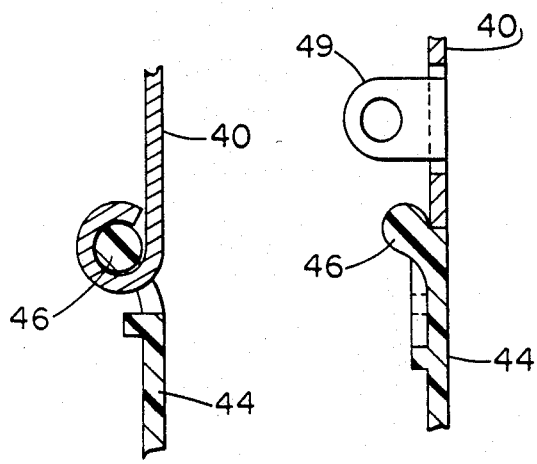
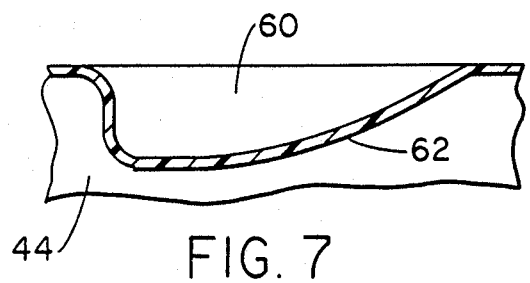
FIG. 5   FIG. 6   FIG. 7
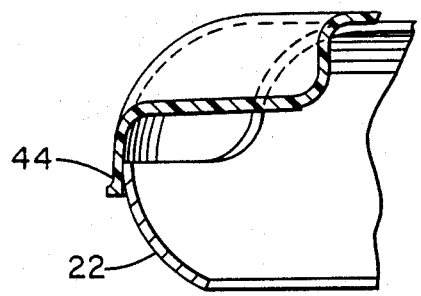
FIG. 8
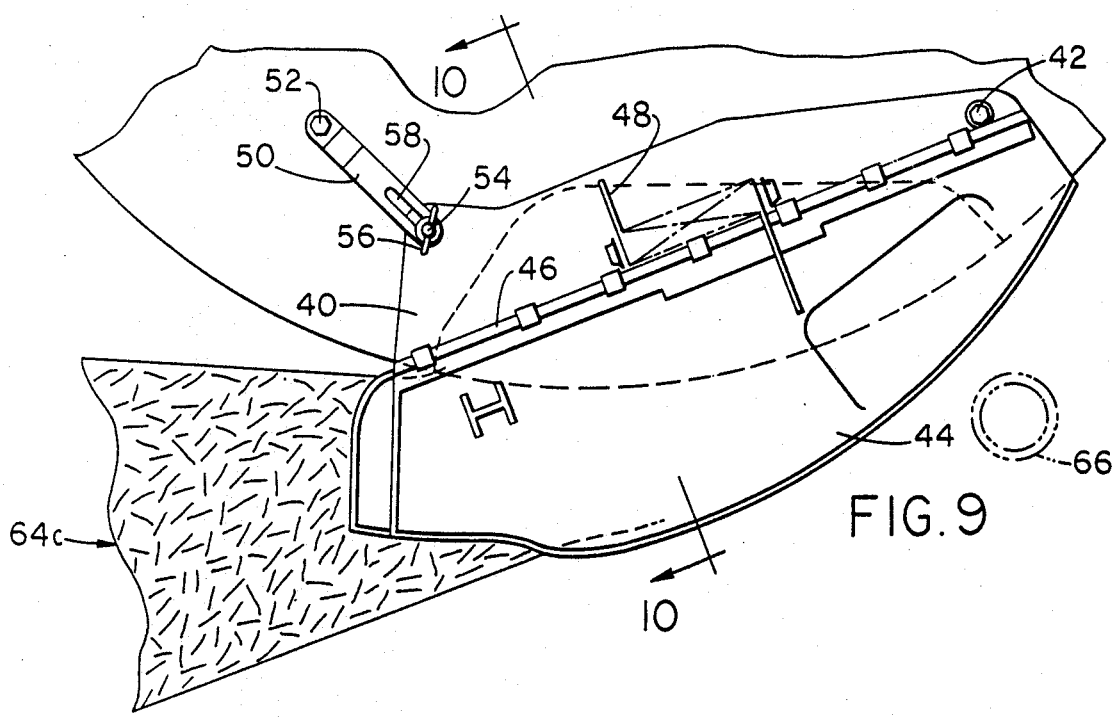
FIG. 9
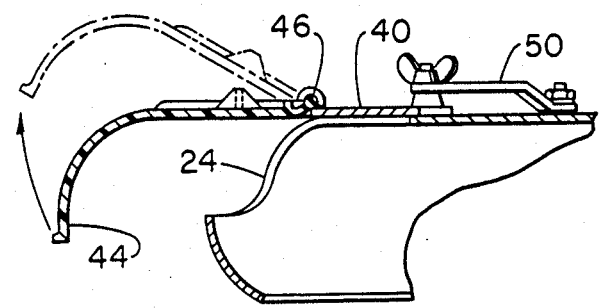
FIG. 10

DISCHARGE COVER ASSEMBLY

BACKGROUND OF THE INVENTION

Conventionally, rotary mowers contain a rapidly-rotating blade contained within a mower housing. There is defined within the mower housing an opening called a discharge opening through which the mower cuttings are discharged from the mower.

At times, the operator wants the cuttings to be spread over the land being cut to decay and fertilize the land. At other times, the operator may want the cuttings to be bagged. A third important function for rotary mowers is mulching, in which case the cuttings are repeatedly cut within the housing and dropped to the ground below the housing. Mulching is performed when the discharge opening is covered so that the cuttings cannot escape from the housing through the opening.

For purposes of this discussion, the invention will be described as a lawn mower used to cut grass and to mulch grass as well as leaves. It is not intended to limit the use of the invention to this type of operation, however.

Specifically, the invention is directed to a cover and a cover assembly for a discharge opening in a mower housing. In particular, the invention is directed to a cover assembly which serves the three functions of mulching, side-discharging, and enabling the attachment needed for rear bagging to be mounted without removing the cover assembly. The cover includes means for improving both the mulching function, as well as aiding in the wide area dispersion of the cuttings.

In spite of the fact that there are a multitude of mower manufacturers and a multitude of different forms of rotary mowers, the prior art does not show a cover assembly for a discharge opening which can perform the previously-described functions.

SUMMARY OF THE INVENTION

In accordance with the invention, a rotary mower has a mower housing which contains a discharge opening through which a discharge stream of cuttings exits the mower. A cover for said opening contains a recess in the forward part of the cover to intercept the discharge stream and break it up to achieve wide area dispersion of the discharge stream on the turf.

Also in accordance with the invention there is described a mower housing containing a deck and a depending skirt. The skirt contains a discharge opening through which a discharge stream of cuttings exits from the mower. A cover assembly comprises a cover configured to overlie and cover the discharge opening. There is also a deck member configured to fit over the deck and to be laterally rotated about a forward pivot on the deck.

A hinge joining the cover and the deck member enables the cover to be rotated to a vertical or near vertical position to permit rear bagging. Finally, means for pivoting the cover assembly is provided to laterally extend and contract the rear of said cover assembly for side discharging and mulching, respectively.

OBJECTS

It is an object of the invention to provide a cover assembly for a lawn mower discharge opening which can be adapted to operate the lawn mower as a mulcher, side discharger and a rear bagger.

It is yet another object of the invention to provide a cover assembly for a discharge opening which includes a means for interrupting and breaking up the discharge stream so that cuttings are dispersed over a wide area.

It is still another object of the invention to provide a cover assembly for a lawn mower discharge opening which automatically retracts in the event the cover assembly hits an immovable object such as a tree trunk or rock, to prevent damage to the mower and the object.

It is yet another object of the invention to provide a recess in the cover of a discharge opening which recess produces wide area dispersion of the discharge stream.

The invention, together with further objects and advantages, will be best understood by reference to the following detailed description when taken in conjunction with the accompanying drawings.

BRIEF DESCRIPTION OF THE DRAWINGS

FIG. 5 is a cross-sectional view of the deck plate hinge arrangement taken at line 5—5 of FIG. 3.

FIG. 6 is a cross-sectional view of the spring securing tab taken at line 6—6 of FIG. 3.

FIG. 7 is a cross-sectional view of the chute indentation for deflecting grass clippings taken at line 7—7 of FIG. 3.

FIG. 8 is a cross-sectional view of the chute indentation taken at line 8—8 of FIG. 3, this view being at right angles to the FIG. 7 depiction.

FIG. 9 is a top view of the deck plate assembly pivoted outward to the open position to enable side discharge of grass clippings.

FIG. 10 is an edge view of the deck plate assembly 20 when in the open position as taken along line 10—10 of FIG. 9.

DETAILED DESCRIPTION OF THE DRAWINGS

Figure 1:
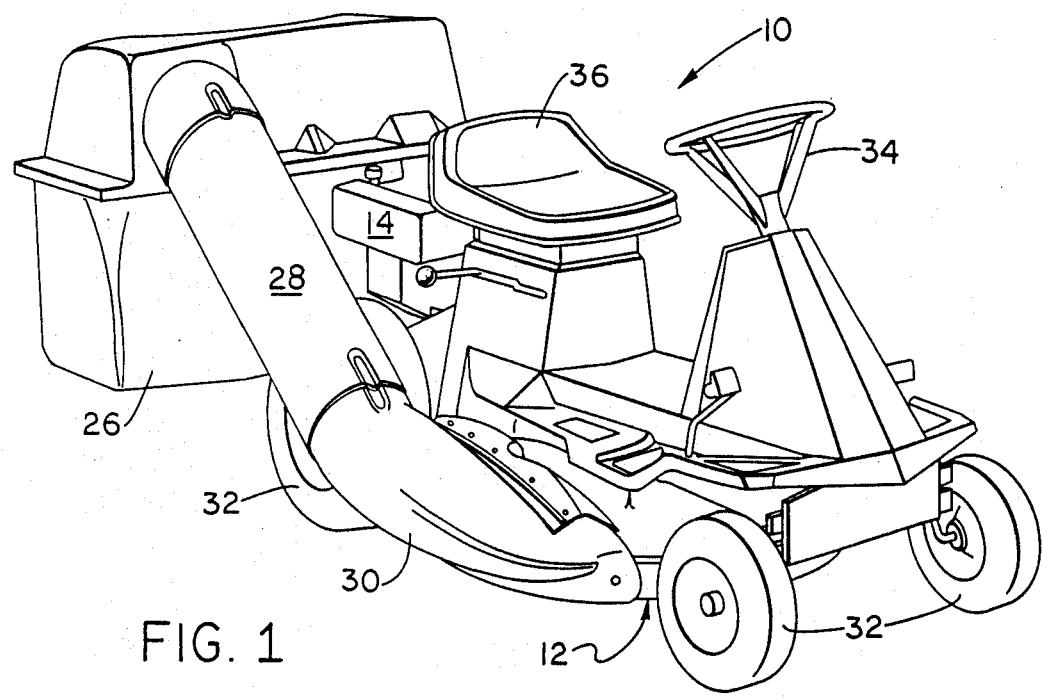
FIG. 1 is a perspective view of a lawn mower containing the invention.
Figure 2:
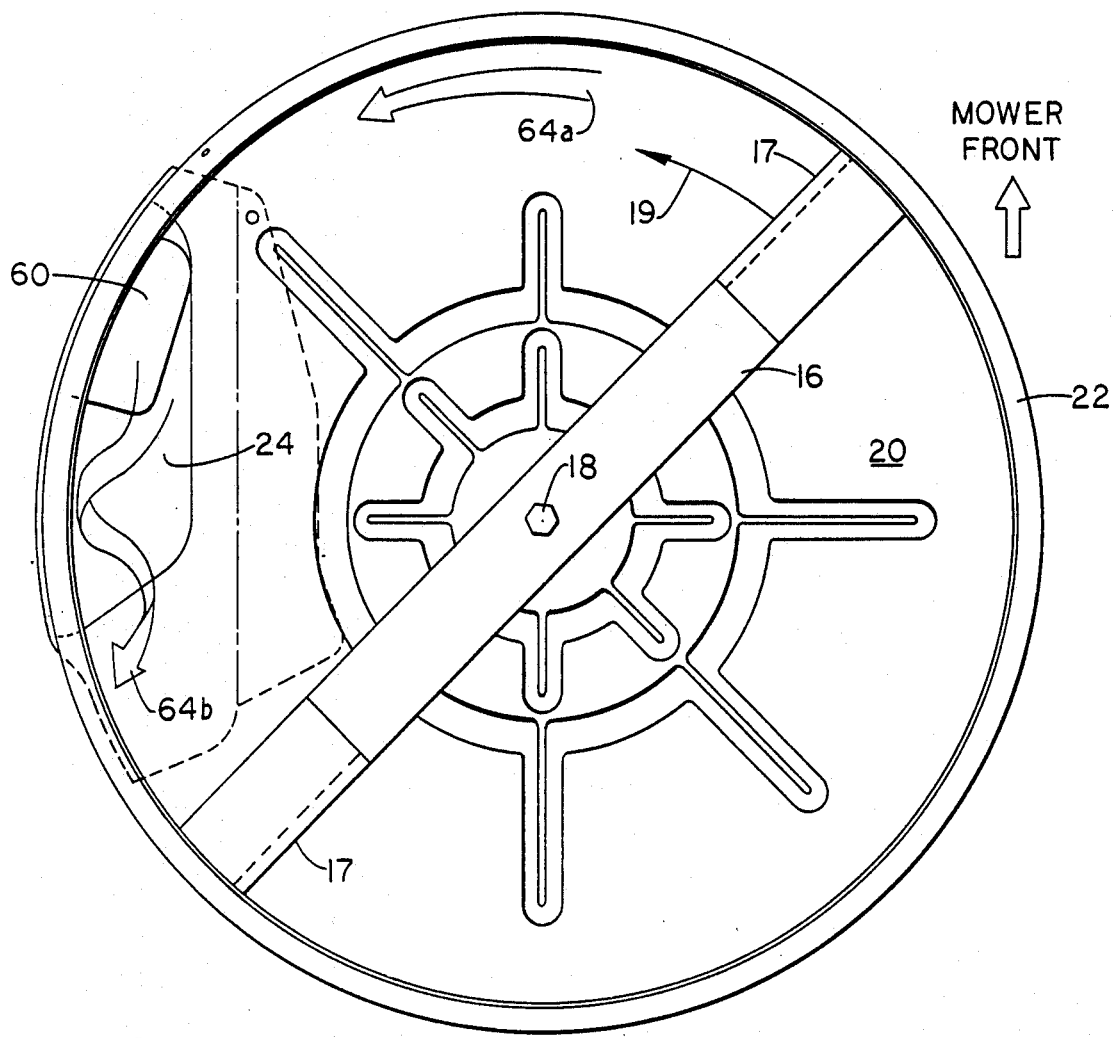
FIG. 2 is a bottom view of the lawn mower deck showing the relationship of the discharge chute and the opening in the deck.

Referring to FIG. 1 of the drawings, there is shown a conventional rotary mower 10. The mower 10 shown in FIGS. 1 and 2 is a riding mower. The invention, however, is applicable to walking mowers as well. As is conventional, the mower 10 contains a mower housing 12 on which is mounted gasoline engine 14. The invention is equally applicable to electrically-driven mowers. Contained within the mower housing 12 is a rotatable blade 16 with cutting edges 17 which is coupled to the engine 14 through a shaft 18 in some conventional way (not shown).

The mower housing 12 contains a planar deck 20 from which depends a skirt 22. Defined within the skirt 22 is a discharge opening 24 through which the discharge stream such as grass cuttings or other matter is discharged from the mower housing 12 and from the mower 10.

The skirt 22 in this case has a high efficiency semicircular section. The invention applies equally to other skirt configurations. FIG. 1 shows a rear bagger 26 which is connected to the discharge opening through a chute 28 and an elbow 30.

The mower 10 also contains wheels 32, steering mechanism 34, and a seat 36, all of which are found on conventional riding mowers and do not form a part of the specific invention disclosed and described herein.

Figures 3, 4:
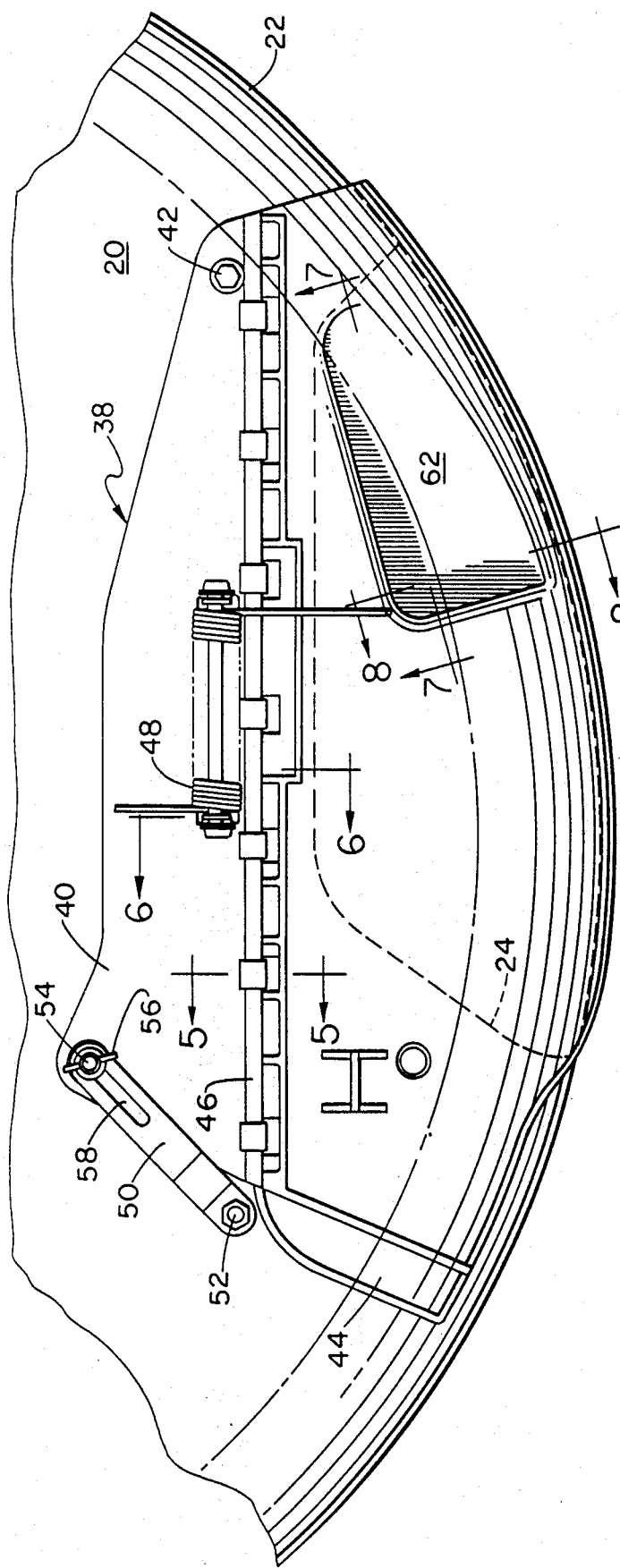
FIG. 3 is a top view of the deck plate assembly portion of the discharge chute positioned in the closed condition for mulching.
FIG. 4 is a side view of the deck plate assembly positioned as in FIG. 3.

FIGS. 3 and 4 most clearly show the cover assembly 38 which is the subject of the present invention. The cover assembly 38 comes with two principal pieces which are planar member 40 and a cover 44. Planar member 40 is mounted to the planar deck 20 through a front pivot 42. The cover 44 is configured to conform generally with the skirt 22 to completely overlie and cover the discharge opening 24. The cover 44 is connected through a hinge 46, to the planar member 40. A spring 48 supported by tabs 49 forming a part of planar member 40 (see FIGS. 4 and 6) biases the cover 44 to its closed position.

The rear end of the planar member 40 is connected to the planar deck 20 by means of a strap 50, pivot 52 and a post 54 containing a wing nut 56. There is defined within the strap 50 a central slot 58 which contains the post 54.

There is defined within the cover a recess 60 located in the forward and bottom part of the cover 44. This is the preferred position though its position may vary with alternate skirt designs. The recess 60 includes a rearwardly sloping base 62 so that the shallow depth is at the front of the base 62.

Mode of Operation

Referring to FIGS. 2 and 3, the blade 16 contains a pair of cutting edges 17. The blade turns counter clockwise in the direction of the arrow 19 and creates a discharge stream of cuttings depicted in FIG. 2 as 64a and 64b. In the normal course of events and in the absence of a cover, the discharge stream 64a would leave the mower housing 20 through the discharge opening 24.

Mulching

In the mulching mode the cover 44 overlies the discharge opening 24. See FIGS. 3 and 4. The discharge stream 64a is carried into contact with the recess 60. The recess 60 is directly into the path of the discharge stream 64a and introduces a turbulence depicted in swirling stream 64b which tends to break up the discharge stream 64a so that a more complete and efficient mulching action takes place. At some point in time the mulched material disperses to the ground through the bottom opening of the mower housing 12.

Side Discharge

The side discharge mode of operation is to be described in conjunction with FIG. 9 of the drawings. In this mode the cover assembly 38 is pivoted outwardly about the pivot 42 and the pivot 52. The cover assembly 38 is held in the position by means of wing nut 56 on post 54 being tightened on strap 50. For reasons to become apparent hereafter, it is advisable to create only a moderate frictional retaining force between the wing nut 56 and the strap 50.

In operation the discharge stream 64 advances through the discharge opening 24 and is directed by the cover 44 out of the mower and onto the ground, symbolically shown by the arrow 64c.

In the absence of the recess 60 the discharge stream would leave the mower more or less as a narrow windrow represented pictorially by the arrow 64a. This is not a desirable configuration for the discharge stream. A windrow represents a highly concentrated form of cutting which tends to decay slowly and inhibit or destroy the growth of grass underneath.

In the present configuration the discharge stream 64a comes in contact with the recess 60. It is broken up by the recess 60 and exits the lawn mower highly dispersed thereby distributing the discharge stream over a wide area of turf. The previously described dispersion is pictorially shown by the arrow 64c.

Rear Bagging

Figure 11:
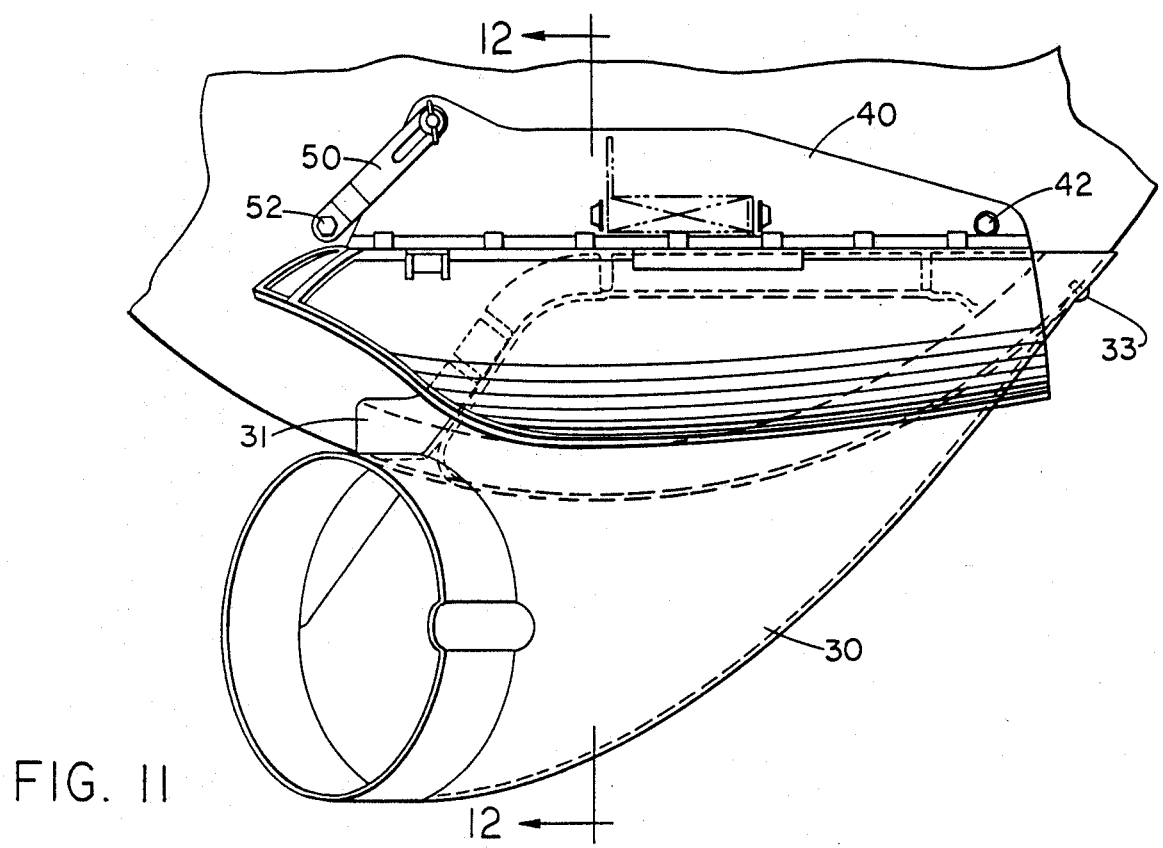
FIG. 11 is a top view of the discharge chute arranged for attachment of a grass catcher as depicted in FIG. 1.
Figure 12:
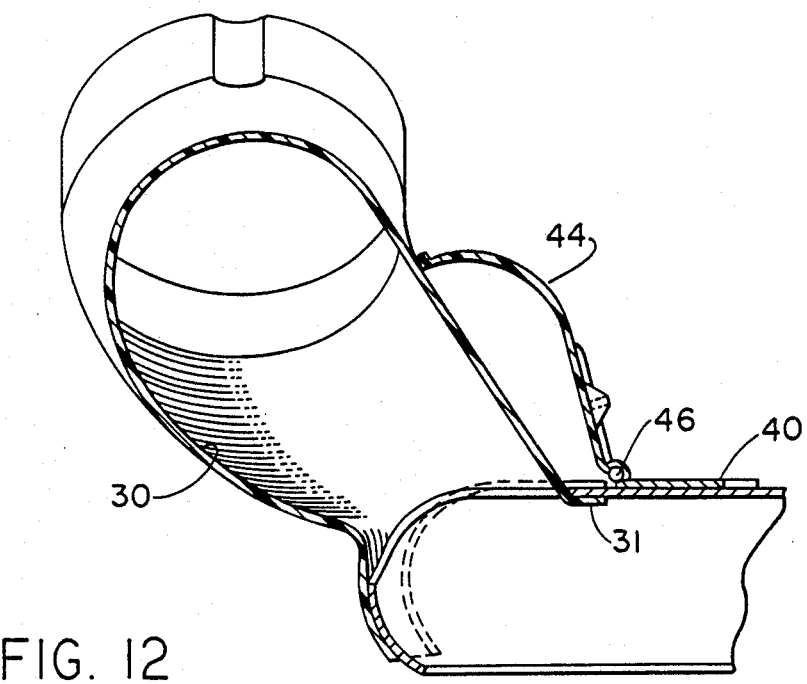
FIG. 12 is a cross-sectional side view of the discharge chute taken along a mower radial line 12—12 of FIG. 11.

For a description of rear bag mode, refer to FIGS. 10, 11 and 12. The cover 44 pivots about the hinge 46 to a more or less upright position shown in FIG. 12. In this position it is possible to mount a discharge elbow 30 over the discharge opening 24. In the FIGS. 11 and 12 configurations, the top of the elbow 30 is fitted to the planar deck 20 by means of the tabs 31.

The opposite side of the elbow opening may be secured to the skirt 22 by means of a sheet metal screw or bolt 33.

An important feature of the invention is that the cover assembly need not be removed to perform any of the previously-described operations. The mower is prepared to perform a side discharge function by simply rotating the cover assembly about a single pivot and maintaining this position by a simple tightening method.

In the event during the process of mowing in a side discharge mode the cover 44 comes in contact with an obstacle shown in phantom 66 in FIG. 9, the cover 44 will simply retract out of the way of the obstacle. The side discharge action can be easily renewed by rotating the cover 44 outboard once again.

It is understood that various modifications of the embodiments disclosed in this detailed description are possible. The foregoing description is provided to enable one skilled in the art to make and use the invention and should not be construed as in any way limiting. Rather, it is intended that the scope of the invention be defined by the following claims.

We claim:

1. In a rotary mower having a mower housing containing a discharge opening through which a discharge stream of cuttings exits the mower, a cover for said opening containing a recess occupying a portion less than the total of the cover including a base member positioned for intercepting the discharge stream and for breaking it up to achieve wide area dispersion of the discharge stream.

2. A recess as defined in claim 1 which is located at the front of the cover.

3. A recess as defined in claim 1 where the base of member the recess slopes rearwardly so that the shallow depth is at the front of the recess.

4. A mower housing containing a deck and a depending skirt, the skirt containing a discharge opening through which a discharge stream of cuttings exits from the mower, a cover assembly comprising:

a cover configured to overlie and cover the discharge opening;

a deck member configured to fit over the deck and to be laterally rotated about a forward pivot on the deck;

a hinge joining the cover and the deck member enabling the cover to be rotated to a vertical or near vertical position for mounting a rear bagger elbow; and means including locking means for pivoting the cover assembly about the forward pivot to laterally extend and contract the rear of said cover assembly.

5. A cover assembly as defined in claim 4 where the cover contains, in addition, a recess for intercepting said discharge stream.

6. A cover assembly as defined in claim 5 where the recess is located to the front and bottom of the cover.

7. A cover assembly as defined in claim 6 where the recess, in addition, has a base which slopes rearwardly so that its shallow end is to the rear.

8. A cover assembly as defined in claim 4 where the deck is planar and said deck member is planar.

* * * * *